Sept. 2, 1958

M. H. MATER 2,850,130

CONTROL MECHANISM FOR RELATIVELY
POSITIONING TWO MOVABLE MEMBERS

Filed Feb. 18, 1957

INVENTOR.
MILTON H. MATER
BY
Buckhorn, Cheatham + Blore
ATTORNEYS

Sept. 2, 1958
M. H. MATER
2,850,130
CONTROL MECHANISM FOR RELATIVELY
POSITIONING TWO MOVABLE MEMBERS
Filed Feb. 18, 1957
4 Sheets-Sheet 2
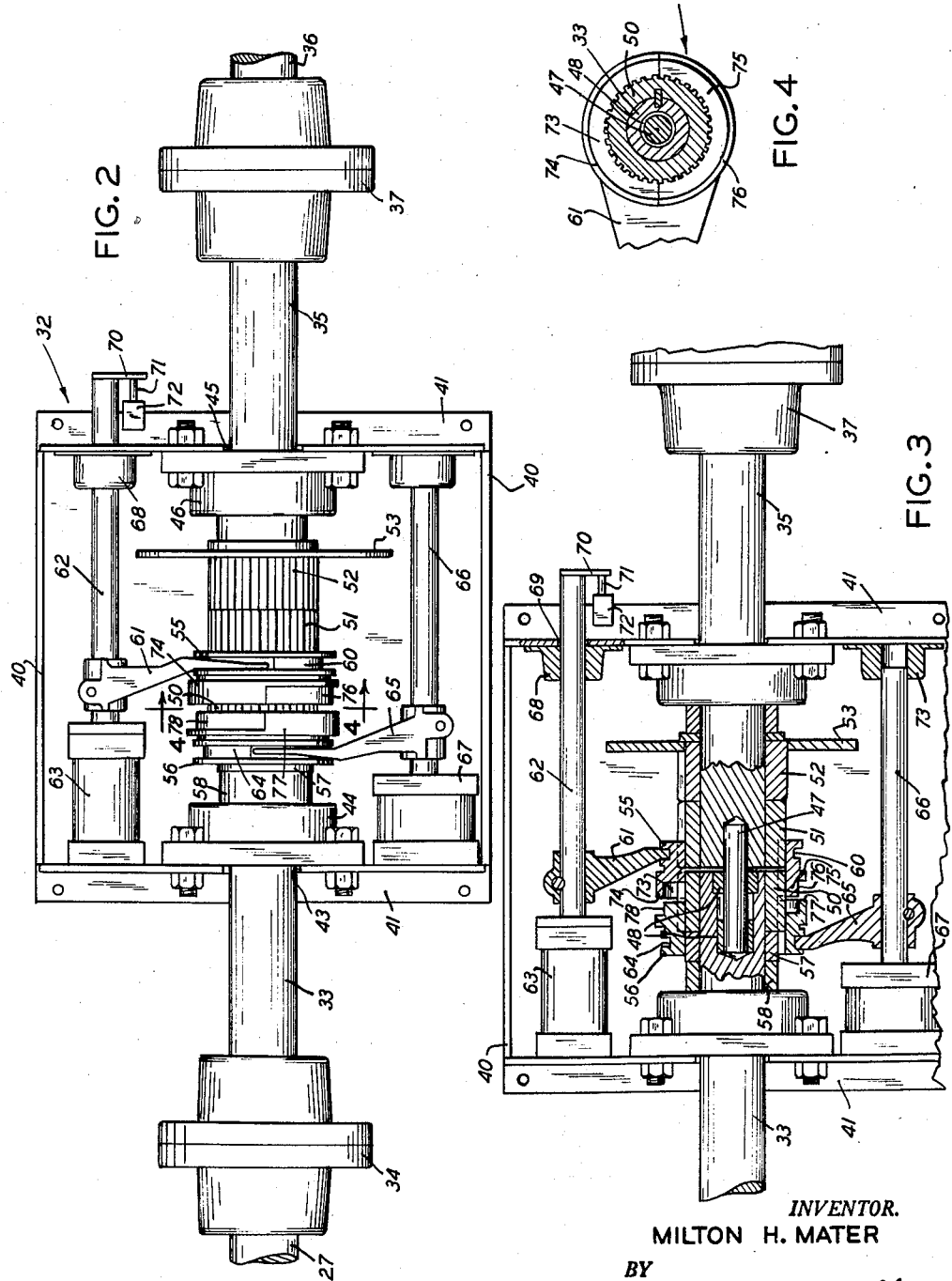
INVENTOR.
MILTON H. MATER
BY
Buckhorn, Cheatham & Blore
ATTORNEYS Sept. 2, 1958  
M. H. MATER  
2,850,130  
CONTROL MECHANISM FOR RELATIVELY  
POSITIONING TWO MOVABLE MEMBERS  
Filed Feb. 18, 1957  
4 Sheets-Sheet 3

INVENTOR.  
MILTON H. MATER  
BY  
ATTORNEYS

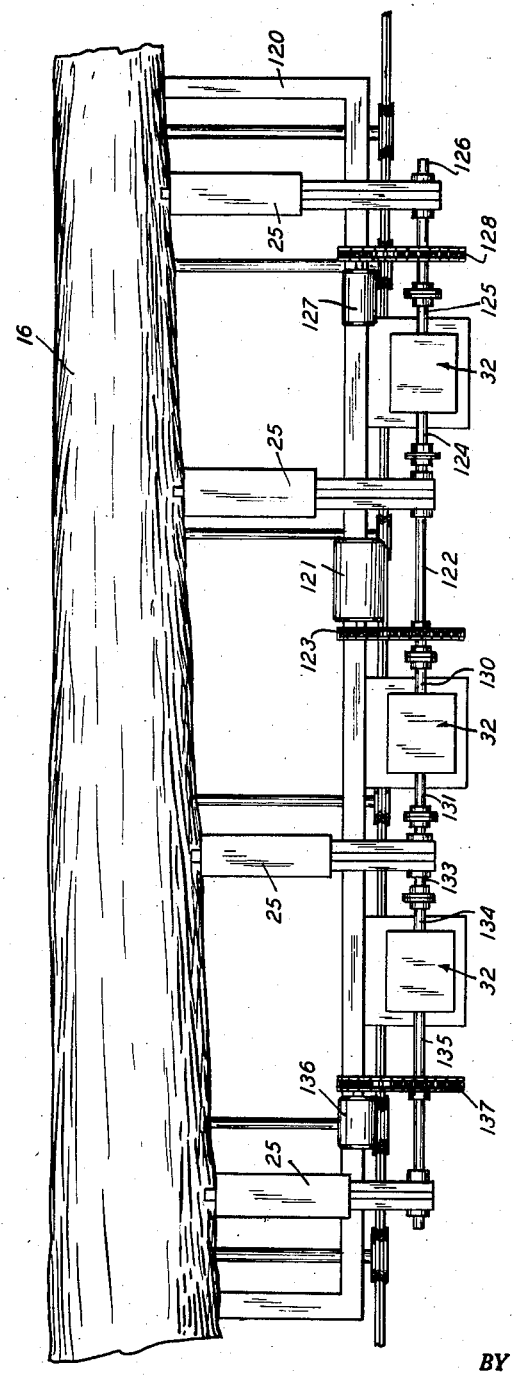

United States Patent Office
2,850,130
Patented Sept. 2, 1958

2,850,130

CONTROL MECHANISM FOR RELATIVELY POSITIONING TWO MOVABLE MEMBERS

Milton H. Mater, Corvallis, Oreg.

Application February 18, 1957, Serial No. 640,855

2 Claims. (Cl. 192—67)

My present invention comprises a mechanism for controlling the relative position of two movable members with respect to each other, the invention being of particular utility in controlling the relative position of one knee on a sawmill carriage to another knee thereon, or for controlling the relative position of two work-holding members on a machine tool. As herein illustrated, the invention is shown in conjunction with a sawmill carriage for controlling the relative position of one or several of the knees on the carriage.

The invention is of particular utility in a sawmill for the purpose of "tapering" the knees of a sawmill carriage whereby a tapered or crooked log may be sawed to the advantage as determined by the sawyer. By virtue of this type of mechanism a tapered log may be set with one longitudinal edge parallel to the saw line, or an irregular log may be variously positioned so as to reduce the amount of waste as much as possible. An object of the present invention is to provide such a mechanism in which the extend of tapering offset of one knee with respect to another may be accurately determined, and held at a constantly fixed value even through the log is successively moved forward by the knees to produce planks or cants from the log.

A further object of the present invention is to provide means in such an apparatus whereby one movable member may be firmly locked in position while another member is relatively moved with respect thereto. In a sawmill it may be desired to have one end of the log remain in exactly a certain relationship while the other is shifted, and the present invention permits such operation.

A further object of the present invention is to provide means for automatically "zeroing" the position of one member with respect to the other without conscious effort on the part of the operator, such "zeroing" being automatically accomplished by the mechanism at the selection of the operator. In regard to this aspect of the invention means are provided whereby, at the selection of the operator, the position of one of the movable members with respect to the other may be "zeroed" at a plurality of relative positions of known distance apart.

A further object of the present invention is to provide means to determine the exact distance which one knee is displaced from other knees, or one work-holding member is displaced from other work-holding members.

A further object of the present invention is to provide a warning to the sawyer or other operator when one member may be displaced without moving the other member, or in another respect, to provide means whereby the operator will know the condition of relative movability of one member with respect to another member.

A further object of the present invention is to provide means to permit the use of the power source mounted upon the carriage for driving the knees of a sawmill carriage in unison under control of the setworks mechanism to also provide the power for displacing one knee with respect to another in a tapering operation. In this respect the invention eliminates the necessity for separate power means mounted upon each of the knees which are intended to be displaced relative to the other knees.

The objects and advantages of the present invention may be more readily understood by reference to the following specification taken in conjunction with the accompanying drawings wherein like numerals refer to like parts throughout.

In the drawings, Fig. 1 is a plan view, somewhat schematic in part, of a sawmill including the saw, the log deck, and a carriage incorporating the present invention;

Fig. 2 is a plan view, with the cover removed, of the mechanism of the present invention for controlling the relative position of two movable knees, the view being on an enlarged scale and showing the mechanism in an engaged position for driving the two knees in unison in either direction;

Fig. 3 is a view similar to Fig. 2 showing the parts in the same relative position and with certain parts broken away along a horizontal plane axially of the setworks shaft;

Fig. 4 is a partial cross section taken substantially along 4—4 of Fig. 2;

Fig. 11 is a view in plan of a modified carriage embodying a plurality of control means of the present invention whereby the relative position of any one or several of four knees may be controlled with respect to each other.

Figure 1:
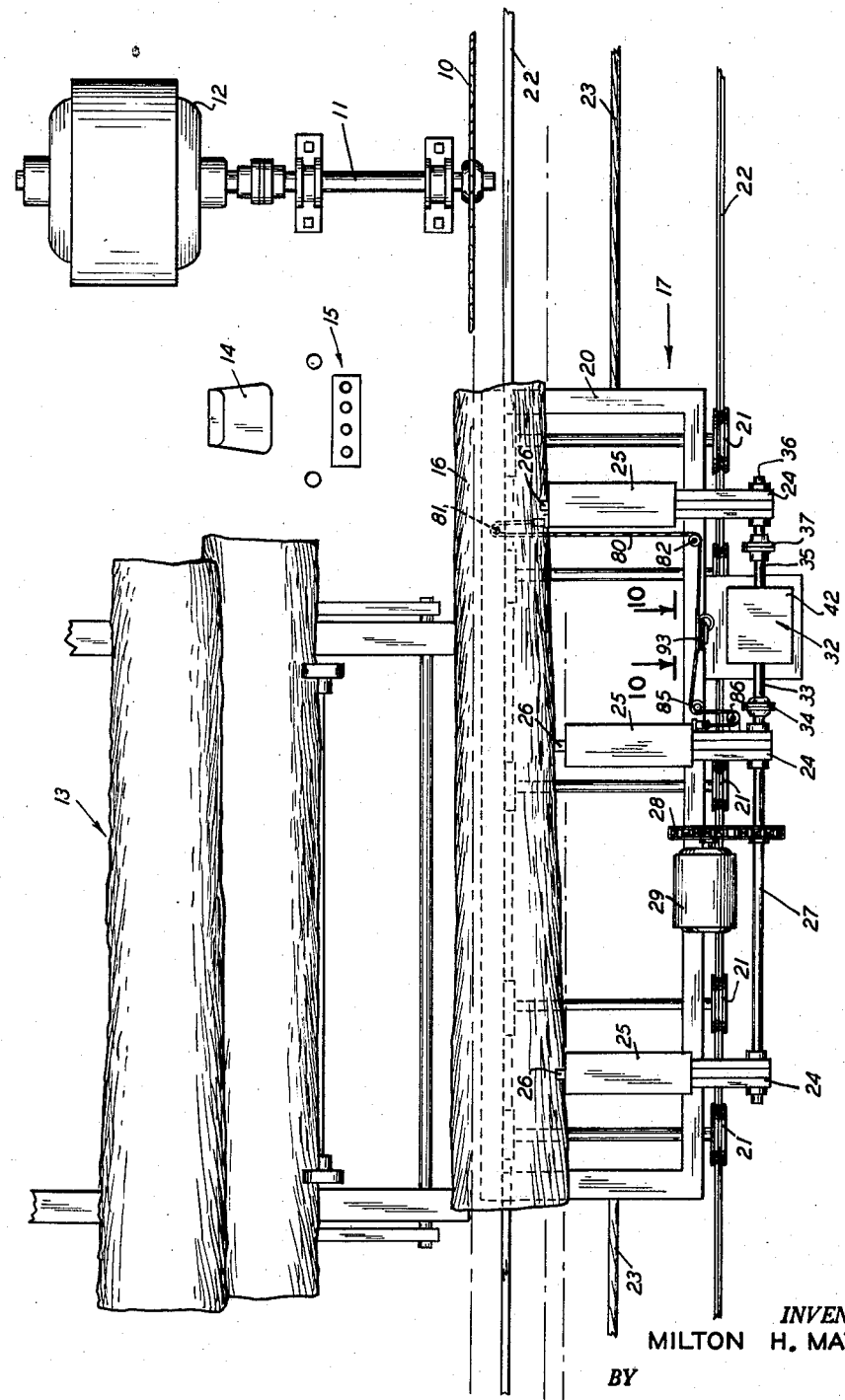

The sawmill illustrated in Fig. 1 comprises a circular saw 10 mounted upon an arbor 11 directly connected to a motor 12. Logs positioned in a log deck 13 may be transferred individually therefrom under control of a sawyer seated at 14 and operating the controls in a control panel 15. A tapered log 16 has been positioned upon the carriage 17 and is shown in position whereby the saw, on its first cut, will remove a slab parallel to the surface of the trunk rather than parallel to the axis of the trunk, this operation being permissible by reason of the taper set of the knees on the sawmill carriage. The carriage comprises a suitable frame 20 mounted upon a plurality of wheels 21 which engage tracks 22, the carriage being movable back and forth along the tracks by means of a cable 23 connected to any suitable power source and to the carriage and controlled by the operator.

The log rests upon head blocks 24, in this instance three being illustrated, and may be shoved forward toward the saw line by knees 25 movable along the head blocks, or pulled rearwardly away from the saw line by the tongs 26 associated with the knees. The knees are moved in either direction along the head blocks by the setworks shaft 27 which is driven by a chain drive 28 from motor 29 mounted upon the carriage and controlled through the usual setworks mechanism. As so far described the sawmill is conventional and details thereof may vary widely. The carriage may be moved by any other suitable form of mechanism, many forms of knees and tongs are readily available, and the means of connecting the setworks shaft to the knees may vary widely. The operator and his control panel may be on carriage, or off carriage as illustrated, and many forms of setworks for controlling the movement of the knees are readily available. Power may be supplied through electric motors, internal combustion engines, hydraulic systems, or pneumatic systems. The present invention may be applied to any sawmill carriage regardless of its nature.

In accordance with the present invention the setworks shaft is broken between two of the knees and the control mechanism 32 of the present invention is interposed between said two knees. In the example illustrated in Fig. 1 the left knee and the middle knee are associated with the setworks shaft 27 so as to be movable at all times coextensively with each other. When performing a tapering operation the tongs 26 of the middle knee would not be utilized so that positioning of the log would be accomplished entirely by the right and left knees. The setworks shaft is prolonged by a driving shaft 33 which enters the mechanism 32 and is connected to the setworks shaft through a rigid coupling 34. The setworks shaft is further prolonged on the other side of the mechanism 32 by a driven shaft 35 connected to a knee shaft 36 through a rigid coupling 37. Internal mechanism of the control mechanism 32 may be so operated under control of the operator that the right knee will be driven in either direction coextensively with the other two knees, or the right knee may remain stationary while the other two knees are driven in either direction. By rigid couplings 34 and 37 I mean that relative rotational displacement of the connected shafts with respect to each other is prevented, but slight angular displacement may be permitted, as is well known in such couplings, whereby slight misalignment of the intermediate shafts is permitted.

In Fig. 2 it is seen that the mechanism 32 comprises a housing 40 which may be bolted to a suitable foundation by bolts passing through flanges 41. A cover 42 is normally in position, the cover being removed to permit inspection of the internal mechanism in Fig. 2. The driving shaft 33 enters one side of the housing through an opening 43 and a bearing 44 mounted on the housing. The driven shaft 35 leaves the opposite side of the housing through an opening 45 and a bearing 46 mounted on the housing. The shafts are in end-to-end coaxial alignment with each other. A centering pin 47 extending coaxially from the end of shaft 35 extends into suitable bearings 48 mounted in a bore in the end of shaft 33, the centering pin thereby preventing play between the ends of the shaft.

A set of externally splined clutch rings are mounted coaxially upon the shafts as follows: The first ring 50 is mounted upon and affixed to the end of the driving shaft 33 with an end face edge in alignment with the end of the driving shaft. The second ring 51 is mounted upon and affixed to the driven shaft 35 with an end face in alignment with the end of the shaft. The third ring 52 is journaled upon the driven shaft 35 in end-to-end relation to the second ring, this ring being rigidly fixed to a plate 53 which is fixed to the housing 40 so as to render ring 52 immovable at all times. The three rings are of equal dimensions so that an internally splined clutch ring slidably mounted upon the set of externally splined clutch rings may be moved into meshing engagement with any one or any adjacent pair of the externally splined clutch rings.

Figure 7:
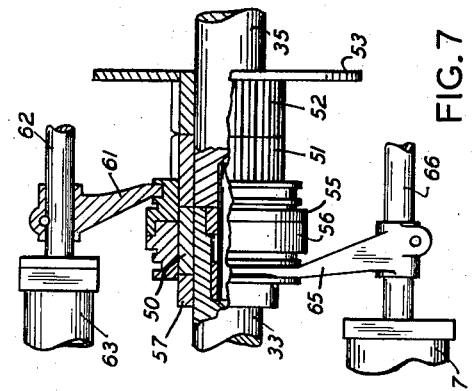
Fig. 7 is a similar view showing the parts in "zeroed" position.
Figure 6:
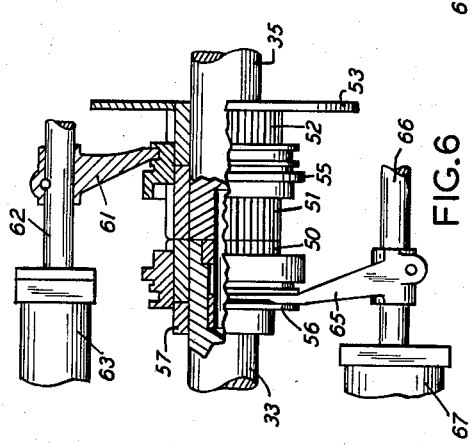
Fig. 6 is a view similar to Fig. 5 showing the parts in locking position whereby one of the members may be moved independently of the other while the stationary member is firmly retained in its position.
Figure 5:
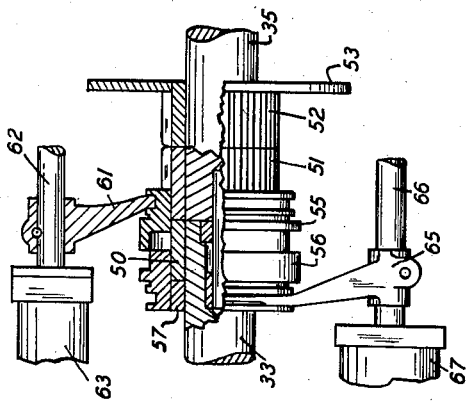
Fig. 5 is a partial view similar to Fig. 3 showing the parts of the mechanism at the start of a "zeroing" operation.

A set of internally splined clutch rings are mounted coaxially upon, meshing with and slidable longitudinally of said set of externally splined clutch rings. The first internally splined ring 55 is movable from an engaged position, as illustrated in Figs. 2, 3, 5, and 7, in which it meshes with rings 50 and 51, to a disengaged position in which it meshes only with ring 51. In the preferred embodiment of the invention as herein illustrated, however, no means are provided to arrest ring 55 in the disengaged position and the ring 55 continues moving to a holding position in which it meshes with both rings 51 and 52, as illustrated in Fig. 6. The second internally splined ring 56 remains at all times in mesh only with ring 50 but may be movable therealong from a retracted position, as illustrated in Figs. 2, 3, and 5, to an advanced position, as illustrated in Figs. 6 and 7. When the ring 56 is retracted a portion thereof surrounds a thrust bearing 57 and spacer collar 58 loosely mounted on shaft 33.

Ring 55 is provided with an external annular groove 60 in which is engaged the bifurcated end of a shifting arm 61 pinned to the piston rod 62 of a first hydraulic positioning means comprising the piston rod 62 and its cylinder 63 mounted upon the wall of the housing. Ring 56 is provided with an external annular groove 64 in which is engaged the bifurcated end of a shifting arm 65 pinned to the piston rod 66 of a second hydraulic positioning means comprising the piston rod 66 and its associated cylinder 67. The free end of the piston rod 62 extends through a bearing 68 mounted on the opposite wall of the housing and an opening 69 in the wall of the housing. A switch actuating bracket 70 on the end of the piston rod is adapted to engage the switch plunger 71 of a switch 72 which controls a signal light or other alarm at the sawyer's position by means of which the operator may be informed as to the position of the ring 55. It is preferred that the alarm be actuated whenever the ring has been moved from its engaged position. The piston rod 66 extends into a journal 73 mounted on the wall of the housing and has limited movement therein. The cylinders 63 and 67 are preferably connected to a single source of fluid pressure whereby fluid at the same gauge pressure may be admitted to the cylinders. The piston area of cylinder 67 is greater than the piston area of cylinder 63 whereby even though fluid may be so admitted to cylinder 63 as to move ring 55 to its engaged position, nevertheless the admission of fluid to the cylinder 67 in the opposite direction will cause ring 56 to move ring 55 to its disengaged position against the force of the cylinder 63 when the rings 55 and 56 are in certain relative rotational relations, as will presently appear.

As seen most clearly in Fig. 4, the end face of ring 55 facing toward ring 56 is provided with a groove 73 adjacent its splines and extending through 180° to define a longitudinally extending peripheral flange 74 extending through 180°. The other half of the same end face of the ring 55 is provided with a longitudinally extending projection 75 of the same radial extent as the groove 73, covering the other half of the end face. This portion is surrounded by a recess 76 of the same width as the flange 74. The adjacent end face of ring 56 is provided with a longitudinally projecting flange 77 adapted snugly to fit into the recess 76, and a second longitudinally projecting flange 78 adapted to fit snugly into the recess 73. The projecting portions 74 and 75 on ring 55 and 77 and 78 on ring 56 thereby provide complementary parts of a longitudinally projecting annulus on the adjacent end faces of the rings. When these parts are exactly in alignment with each other, as illustrated in Fig. 2, the rings 55 and 56 may be moved into complementary interfitting engagement with each other as illustrated in Fig. 7. This will only happen at one exactly defined relative rotational position of shaft 33 with respect to shaft 35. At any other relative rotational position of the shafts the projection 74 will engage the projection 77, and the projection 75 will engage the projection 78, to prevent such close engagement and the two rings will be held in the relative position illustrated in Fig. 5. The stronger force exerted by cylinder 67 will therefore overcome the holding tendency of cylinder 63 and will move ring 55 from its engaged position to its disengaged position until relative rotation brings the complementary parts into interfitting alignment whereupon the cylinder 63 will move the ring 55 back to its engaged position. By this means assurance can be given that the two shafts will be aligned at a definite angular position with respect to each other and the operator will then know that the shafts are "zeroed" with respect to each other. It will be observed that when the ring 55 is thus moved to the right, the switch 72 is actuated to energize the alarm, and immediately upon intermeshing of the rings the alarm will be de-energized.

Figure 10:
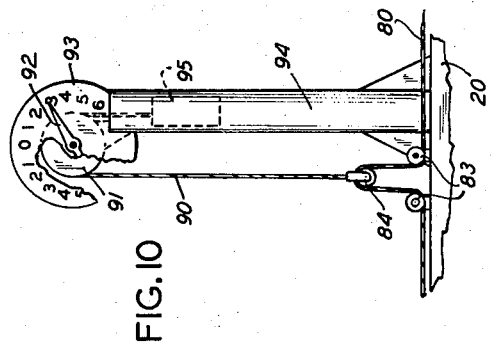
Fig. 10 is a partial, vertical section, on an enlarged scale, taken substantially along line 10—10 of Fig. 1 and showing an indicator employed with the present invention.

Means for indicating the relative position of one of the movable members with respect to the other are illustrated in Figs. 1 and 10. A cable 80 is attached at one end to the right knee 25 and passes about an idler pulley 81 mounted on the carriage, then back alongside of the knee to a second idler pulley 82 mounted on the opposite side of the carriage. The cable then passes about a pair of closely spaced idler pulleys 83 between which a bight of the cable extends upwardly and engages a dial actuating pulley 84. The cable then passes on and about an idler pulley 85, then rearwardly around an idler pulley 86, and is then attached to the rear end of the middle knee 25. The pulley 84 is hung from the lower end of a dial actuating cable 90 which passes around a dial pulley 91 fixed to the shaft of a pointer 92 mounted in bearings in a dial 93 which is fixed to the upper end of a pipe standard 94 mounted on the carriage. The opposite end of the cable 90 is affixed to a weight 95 which slides up and down within the pipe standard 94. The face of the dial 93 is provided with indicia including a central zero position and serial numbers of ascending order on each side of the zero position. Each of the numbers represents a unit displacement of one knee with respect to the other (or one rotation of shaft 33 with respect to shaft 35). When the pointer is at the zero position the operator will know that the shafts 33 and 35 are "zeroed" with respect to each other at such a position that the knees on each side of the mechanism 32 are longitudinally in alignment with each other and would hold a uniform diameter log axially parallel to the saw line. When the pointer is at one of the numerals on either side of the zero numeral on the dial the operator will know that the knees are relatively displaced in the corresponding direction by a unit amount, even though the shafts 33 and 35 are "zeroed" with respect to each other. This is of importance in some operations, for example, in sawing a tapered log. The operator may have made a saw cut with the taper "zeroed" at numeral 4 on the dial in one direction, then may have shifted one end of the log with respect to the other but decided to go back to the same relative setting and make a second cut parallel to the first. The mechanism can be controlled to again "zero" the shaft with the pointer at the same numeral 4 indication and the operator can be certain that the second cut will be parallel to the first.

From the foregoing it will be apparent that the left and central knees always move in unison but that movement thereof with respect to the right knee may be controlled in any desired manner. When the right knee is to remain stationary it will be definitely locked in its stationary position by virtue of ring 51 engaging both rings 51 and 52 with the mechanism in the position illustrated in Fig. 6. When ring 55 is so positioned the left and central knees may be moved regardless of the position of ring 56. When it is desired to move the right knee without reference to any "zeroed" position of the two shafts, the ring 55 may be moved to its engaged position while ring 56 remains in its retracted position. Whenever it is desired to align the knees, or to offset them at a known value, the ring 56 is moved to its advanced position while ring 55 is in engaged position, such movement resulting in temporary disengagement of ring 55 until the zero position is reached.

Figure 8:
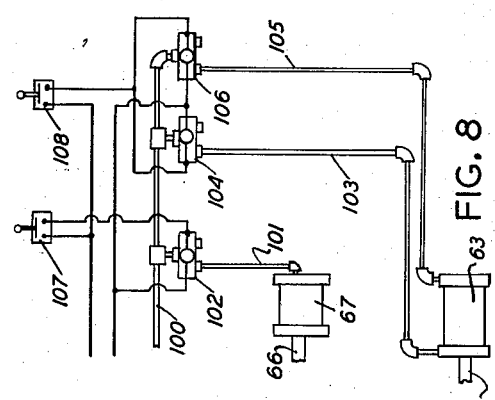
Fig. 8 is a schematic view showing control means employing electric switches for controlling the mechanism of the present invention.

Fig. 8 schematically illustrates a control circuit and piping diagram whereby cylinders 63 and 67 may be supplied with fluid pressure from a single source through a pipe 100. A branch line 101 leading to cylinder 67 is provided with a control valve 102. A second branch line 103 leading to one end of cylinder 63 is provided with a control valve 104, and a third branch line 105 leading to the opposite end of cylinder 63 is provided with a control valve 106. Valve 102 is controlled by a manually actuated switch 107 and valves 104 and 106 are controlled by a second manually actuated switch 108, which switches are convenient to the operator. Valves 104 and 106 are so arranged that upon opening of one the other is closed and vice versa whereby ring 55 is positively moved in either direction. Valve 102 is movable from open to closed position by the switch 107 whereby admission of fluid to cylinder 67 causes actuation of ring 56 for the "zeroing" operation.

Figure 9:
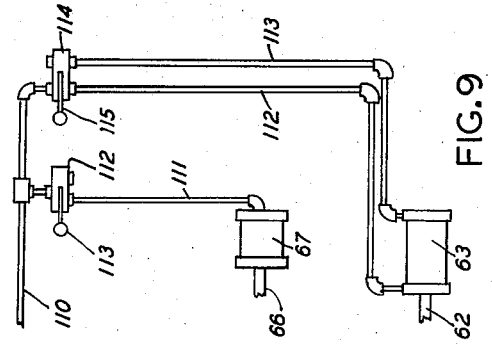
Fig. 9 is a similar view showing control means employing hydraulic valves.

Fig. 9 is a schematic control diagram whereby valves in a hydraulic supply system are manually actuated. In this system a main line 110 provides a source of fluid under pressure from which a first branch 111 leads to cylinder 67 and second and third branches 112 and 113 lead to the opposite ends of cylinder 63. A first valve 112 is provided with a manual lever 113 which in one position admits fluid to the cylinder 67 and in its other position cuts off the pressure and opens the cylinder 67 to exhaust. A valve 114 is provided with a manual lever 115 which in one position supplies fluid to one end of cylinder 63 and permits exhaust from the opposite end, and in its reversed position supplies fluid to the opposite end of cylinder 63 and permits exhaust from the first end. Either system of controls or any other suitable system of controls may be employed.

The invention is illustrated in association with a larger carriage in Fig. 11, the carriage 120 in this instance being provided with four knees 25 as previously described. A main setworks motor 121 mounted upon the carriage drives a main setworks shaft section 122 through the chain drive 123. The right end of shaft 122 is connected to a first driven shaft 124 which extends into a control mechanism 32 as previously described. At the output end a driven shaft 125 is connected to an extension shaft 126 which is suitably connected to the right knee 25. When this first control mechanism is disengaged the extension shaft 126 may be independently driven by a second motor 127 connected through a chain drive 128. However, when the first control mechanism 32 is engaged and motor 127 de-energized the right and first intermediate knees may be driven in unison. On the opposite end shaft 122 is connected to a second driven shaft 130 which extends into a second control mechanism 32. The driven shaft 131 extending therefrom is connected to an aligned shaft 133 which drives the second intermediate knee 25. Shaft 133 is connected to a driving shaft 134 which extends into a third control mechanism 32, the driven shaft 135 therefrom being connected to the left knee 25. A second supplemental motor 136 is connected to shaft 135 through a chain drive 137. When shaft 131 is being driven and the third control mechanism engaged, supplemental motor 136 being de-energized, the left knee may be driven in unison with the next adjacent intermediate knee. However, by disengaging the third control mechanism and energizing motor 136 the left knee may be driven independently. It is to be appreciated that suitable controls as previously described are provided for each control mechanism and suitable controls are provided for operating the supplemental motors as well as the main setworks motor. It is to be appreciated that suitable dials would be interposed between each adjacent pair of knees as previously described. By reason of this construction any one of the knees may be driven independently of the others, or any pair of adjacent knees may be separately operated, or all four knees may be driven in unison. Each of the knees may be "zeroed" on the same line parallel to the saw line or any one may be "zeroed" on any other known increment of distance with respect to any other knee. It is obvious that the present invention may be used in any desired combination to achieve a multitude of results for the purpose of positioning members with respect to each other.

Having illustrated and described a preferred embodiment of my invention, it should be apparent to those skilled in the art that the same permits of modification in arrangement and detail. I claim as my invention all such modifications as come within the true spirit and scope of the following claims:

I claim:

1. A mechanism for controlling the relative position of two movable members with respect to each other, comprising a driving shaft, reversable motor means drivingly connected to said driving shaft, means connecting said driving shaft to one of said members to effect its movement in either direction when the driving shaft is rotated accordingly, a driven shaft in coaxial alignment with, and in end-to-end relation to, said driving shaft, means connecting said driven shaft to the other of said members to effect its movement in either direction when the driven shaft is rotated accordingly, a set of two externally splined clutch rings of equal dimensions, the first of said rings being mounted upon, and affixed to, the end of said driving shaft adjacent the end of said driven shaft, the second of said rings being mounted coaxially upon, and affixed to, the end of said driven shaft adjacent the end of said driving shaft, a set of two internally splined clutch rings mounted coaxially upon, meshing with and slidable longitudinally of, said set of externally splined clutch rings, the first of said internally splined rings being movable from an engaged position meshing with both said first and second externally splined rings whereby said members may be moved in unison, to a disengaged position meshing with said second externally splined ring alone whereby said one member may be moved while the other remains stationary, first hydraulic cylinder positioning means selectively operable to position said first internally splined ring, said second internally splined ring remaining in mesh only with said first externally splined ring at all times but being movable from a retracted position thereon to an advanced position thereon, second hydraulic cylinder positioning means selectively operable to position said second internally splined ring, and the adjacent ends of said first and second internally splined rings each comprising a complementary part of a longitudinally projecting annulus, said second positioning means being stronger than said first positioning means whereby movement of said second internally splined ring to its advanced position causes movement of said first internally splined ring from its engaged positions while said complementary parts remain in end-to-end engagement, and upon the shafts becoming rotatively aligned at a definite angular relation to each other permitting interlocking of said complementary parts said first positioning means will thereupon return said first internally splined ring to its engaged position.

2. A mechanism for controlling the relative position of two movable members with respect to each other, comprising a driving shaft, a reversable motor means drivingly connected to said driving shaft, means connecting said driving shaft to one of said members to effect its movement when the driving shaft is rotated, a driven shaft in coaxial alignment with, and in end-to-end relation to, said driving shaft, means connecting said driven shaft to the other of said members to effect its movement when the driven shaft is rotated, a set of three externally splined rings of equal dimensions, the first of said externally splined rings being mounted coaxially upon, and affixed to, the end of said driving shaft adjacent the end of said driven shaft, the second of said externally splined rings being mounted coaxially upon, and affixed to, the end of said driven shaft adjacent the end of said driving shaft, the third of said externally splined rings being journaled upon said driven shaft adjacent said second externally splined ring, means fixed to said third externally splined ring to prevent its rotation at all times, a set of two internally splined rings mounted coaxially upon, meshing with and slidable longitudinally of, said set of externally splined rings, the first of said internally splined rings being movable from an engaged position meshing with both said first and second externally splined rings whereby said members may be moved in unison, to a holding position meshing with both said second and third externaly splined rings whereby said one member may be moved while the other member is positively held in a stationary position, first hydraulic cylinder positioning means selectively operable to position said first internally splined ring, said second internally splined ring remaining in mesh only with said first externally splined ring at all times but being movable from a retracted position thereon to an advanced position thereon, second hydraulic cylinder positioning means selectively operable to position said second internally splined ring, and the adjacent ends of said first and second internally splined rings each comprising a complementary part of a longitudinally projecting annulus, said second positioning means being stronger than said first positioning means whereby movement of said second internally splined ring to its advanced position while said first internally splined ring is in its engaged position causes disengagement of said first internally splined ring until the shafts become rotatively aligned at a definite angular relation to each other.

References Cited in the file of this patent

UNITED STATES PATENTS

| 2,592,819 | Moessinger | Apr. 15, 1952 |
| 2,770,150 | Culverwell | Nov. 13, 1956 |